June 27, 1967     D. R. HORTVET     3,327,681
INTERNAL SURFACE APPLICATOR FOR TUBULAR MEMBERS
Filed April 2, 1962     7 Sheets-Sheet 1

INVENTOR.
DOUGLAS R. HORTVET
BY
*Andrus & Starke*
ATTORNEYS

June 27, 1967  D. R. HORTVET  3,327,681
INTERNAL SURFACE APPLICATOR FOR TUBULAR MEMBERS
Filed April 2, 1962  7 Sheets-Sheet 2

INVENTOR.
Douglas R. Hortvet
BY
Andrus & Starke
ATTORNEYS

June 27, 1967    D. R. HORTVET    3,327,681
INTERNAL SURFACE APPLICATOR FOR TUBULAR MEMBERS
Filed April 2, 1962    7 Sheets-Sheet 3

INVENTOR.
Douglas R. Hortvet
BY
Andrus & Starke
ATTORNEYS

June 27, 1967 D. R. HORTVET 3,327,681
INTERNAL SURFACE APPLICATOR FOR TUBULAR MEMBERS
Filed April 2, 1962 7 Sheets-Sheet 4

INVENTOR.
DOUGLAS R. HORTVET
BY
Andrus & Starke
ATTORNEYS

June 27, 1967 D. R. HORTVET 3,327,681
INTERNAL SURFACE APPLICATOR FOR TUBULAR MEMBERS
Filed April 2, 1962 7 Sheets-Sheet 5

INVENTOR.
DOUGLAS R. HORTVET
BY
Andrus & Starke
ATTORNEYS

June 27, 1967        D. R. HORTVET        3,327,681

INTERNAL SURFACE APPLICATOR FOR TUBULAR MEMBERS

Filed April 2, 1962        7 Sheets-Sheet 6

INVENTOR.
DOUGLAS R. HORTVET
BY Andrus & Starke
ATTORNEYS

June 27, 1967 D. R. HORTVET 3,327,681
INTERNAL SURFACE APPLICATOR FOR TUBULAR MEMBERS
Filed April 2, 1962 7 Sheets-Sheet 7

INVENTOR.
DOUGLAS R. HORTVET
BY
Andrus & Starke
ATTORNEYS

United States Patent Office 3,327,681
Patented June 27, 1967

1

3,327,681
INTERNAL SURFACE APPLICATOR FOR TUBULAR MEMBERS
Douglas R. Hortvet, Houston, Tex., assignor to A. O. Smith Corporation, Milwaukee, Wis., a corporation of New York
Filed Apr. 2, 1962, Ser. No. 184,463
9 Claims. (Cl. 118—9)

This invention relates to an internal surface applicator for tubular members and particularly to a spray applicator for applying a plastic resin coating to the interior of a pipe or the like.

For many years the external surfaces of pipes, such as gas and oil transmission pipe, have been coated with corrosion resistant material. Epoxy resin paints have recently been applied to the internal surface by spray type applicators, to protect the surface from corrosion and increase the rate of flow through the line by reducing surface friction. One of the more serious problems involved in the spray application of a coating to relatively long members is maintaining accurate control of the spraying apparatus and preventing the leakage of coating materials from the transfer mechanism. This is particularly true with high pressure application normally required for high speed coating of an epoxy resin paint.

The more recent suggestions for applying of epoxy resins have employed rotating spray guns in an attempt to provide an even uniform application of the epoxy resin within the pipe. Generally, the spray head is carried on the end of a boom and driven by a long shaft extending through the boom. This has presented problems of maintaining uniform speed and control of the rotating head. Where the boom moves into a stationary pipe member, the regulation of speed of the rotating head and of the conveyor, which must be closely timed, has also presented difficulties.

The present invention is particularly directed to an improved boom mounting and rotary head forming a part of the boom for application of uniform and high quality coating of epoxy resins paints or other suitable coating material to tubular members. The present invention is also particularly directed to the provision of an applicator assembly which will accommodate tubular members of greatly varying diameters with a minimum change in the applicator apparatus and without a reduction in the quality of the coating.

In accordance with the present invention, the boom is pivotally supported at the tail end and is supported at the forward by a disappearing jack which is actuated by the movement of tubular members being coated. The boom is stationary in the axial direction and the pipe is driven into telescoped relation with the boom and then withdrawn from the boom during the coating process. A boom stabilizing unit is secured to and forms a forward part of the boom and includes means for accommodating the various diameter pipes and stabilizing the forward mounting of the boom within the pipe.

A rotary head drive and control unit is secured to the forward end of the stabilizing unit and forms a further extension of the boom. The boom proper does not rotate and merely serves as a conduit for air lines, hydraulic and electrical control lines as well as the line for carrying the coating material to the rotary head. The various controls are mounted within the rotary head drive and control unit including a constant torque variable speed hydraulic motor which is coupled to drive the rotary head unit provided on the forward end of the drive and control unit.

The hydraulic motor of the present invention which is mounted within the forward portion of the boom assembly is a particularly important feature. The hydraulic motor

2 is a relatively high constant torque and variable speed unit which attains its adjusted speed rapidly. The speed of the motor is regulated through a flow control valve which is mounted on the hydraulic power unit located adjacent to the machine. Infinite variable speeds are available and the motor maintains its set speed very accurately with any desired setting of the flow control valve. The compactness of the hydraulic motor allows mounting in the forward end of the boom with a very short mechanical coupling of the motor to the rotating head. This provides optimum control of the rotation of the head unit.

The roatry head unit of the present invention includes a quick-change head for simultaneously removing all of the separate spray guns to allow frequent and rapid cleaning of the assembly. The quick-change head provides maximum alignment and proper positioning of the spray gun applicators. A special rotary seal is provided to permit the high pressure application of epoxy resins through the rotating gun without leakage within the rotary head or the drive and control unit.

The use of quick-change heads is also important where the equipment is used for coating different sized pipes. It has been found that a particular spacing of the spray gun from the surface provides an optimum coating and the spray guns should be changed accordingly.

The control valve for the coating line is mounted immediately adjacent the rotating head. This permits rapid and excellent response of the control of the spray guns for initiating and terminating the transmission of the paint through the guns and thereby minimizes and essentially eliminates any leaking and dripping or excess spraying.

The present invention is particularly directed to an internal pipe applicator for the rapid application of a uniform and high quality coating to the internal surface of a tubular member and is particularly adapted for mass production of pipes internally coated with an epoxy resin paint formed of an epoxy resin and a suitable curing or hardening agent and, if desired or necessary for establishing optimum viscosity, a small amount of a suitable solvent.

The drawings furnished herewith illustrate the best mode presently contemplated for carrying out the invention.

In the drawings.

Figure 1:
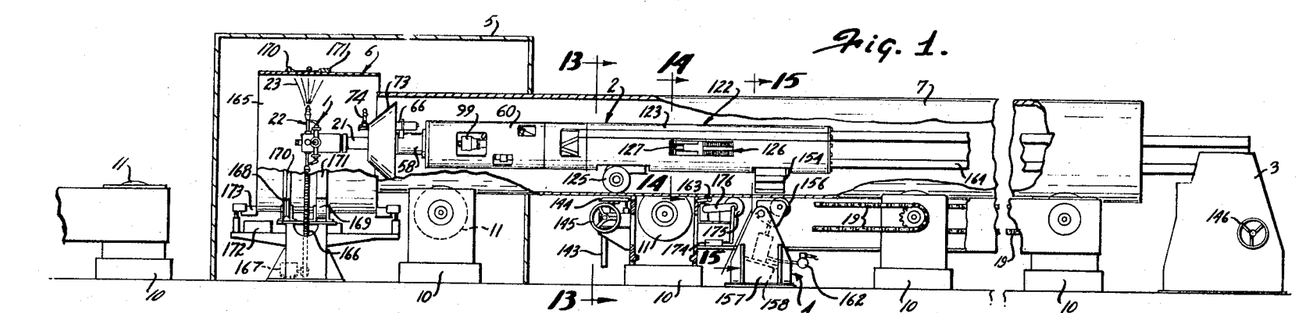
FIG. 1 is a side elevational view of an applicator apparatus constructed in accordance with the present invention and with parts broken away to show details of construction.

Referring to the drawings and particularly to FIG. 1, the illustrated paint spray apparatus includes a rotating spraying unit 1 secured to the forward and free end of a cantilevered boom or boom asembly 2. A boom tail support 3 is secured to the back end of the boom assembly 2 by a suitable pivot connection permitting limited angular movement in a vertical plane. The boom assembly 2 may extend outwardly up to 40 feet or more for the coating of relatively long tubular members and a disappearing boom support 4 is provided adjacent the forward and free end of the boom assembly 2 to support it in the standby condition of the apparatus. The forward end of the boom 2 and the spraying unit 1 are mounted within a spray booth 5 wherein a collector ring assembly 6 is provided encircling the rotating spraying unit 1 to collect the paint and return it to a central source during the initial and terminal rotational movement of the rotating unit 1 and in the absence of a pipe or the like.

Figure 3:
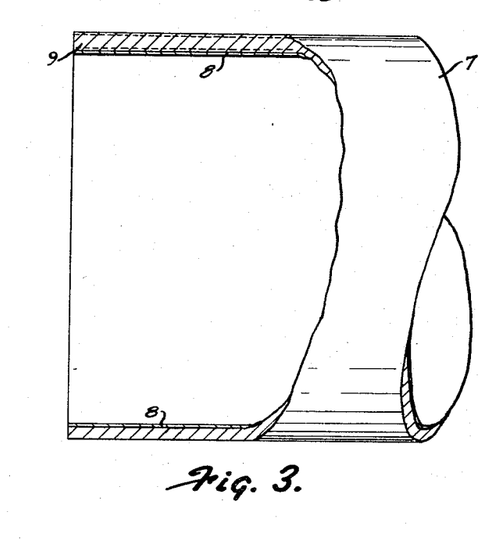
FIG. 3 is a fragmentary view of a pipe having an internal coating thereon.

A metal pipe 7 is shown mounted in the apparatus to pass by the rotating spraying unit 1 which applies a uniform coating 8 to the internal surface thereof as shown in FIG. 3. The illustrated pipe 7 is formed by shaping a flat sheet to a tubular configuration and joining the adjacent edges by a longitudinal flash weld 9 having inner and outer ridges.

The pipe 7 is carried on a plurality of longitudinally spaced drive pedestals 10 including one centrally of the spray booth 5 and an equal number on opposite sides thereof to accept a selected maximum length of pipe 7. Each of the pedestals 10 rotatably supports a power driven V-shaped roller 11 on which the pipe 7 rests. An incoming and uncoated pipe 7 is mounted on the pedestals to the left of booth 5 in FIG. 1 and rollers 11 are simultaneously driven to move the pipe 7 through the spray booth 5 and the ring assembly 6 onto the boom assembly 2, as shown in FIG. 1 while maintaining the spraying unit 1 inactive. The spraying uint 1 is actuated for application of the protecting coating 8. The rollers 11 are then oppositely rotated and move pipe 7 back through booth 5 and over unit 1.

Figure 2:
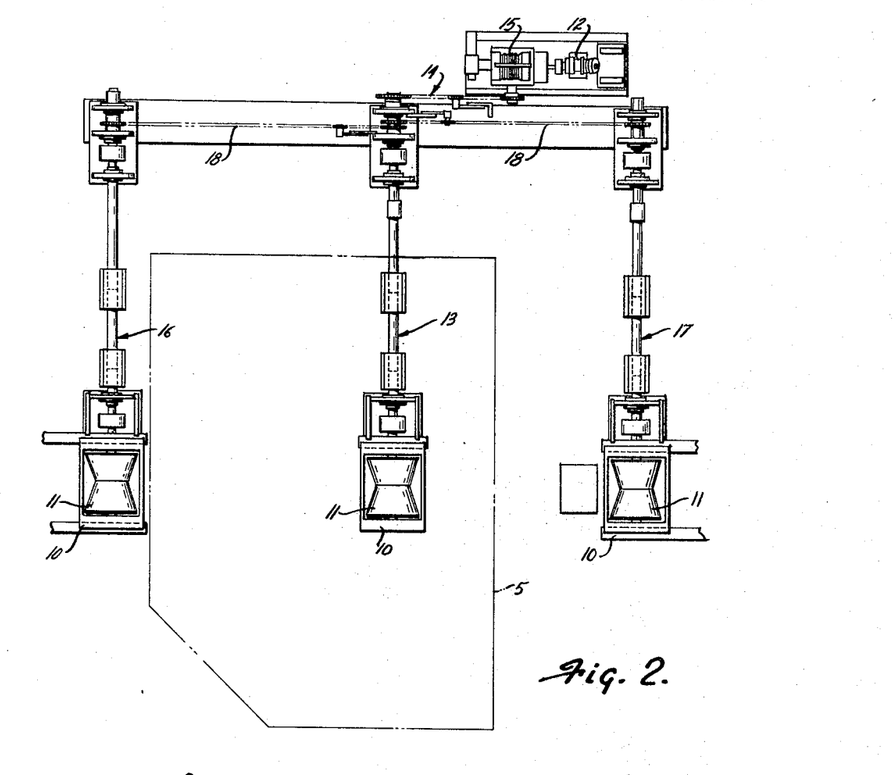
FIG. 2 is a plan view of a portion of the pipe conveyor unit and the relationship to a paint booth with the spray guns and supporting boom removed.

Referring particularly to FIG. 2, a plan view of the pedestals 10 within and adjacent the paint booth 5 are shown interconnected to a hydraulic motor 12 for simultaneous rotation of the respective rollers 11 as follows. The roller 11 of the pedestal within the spray booth 5 includes a driven shaft assembly 13 which terminates exteriorly of the booth 5 and is coupled by a chain and sprocket unit 14 to the output of a mechanical speed reducer 15. The hydraulic motor 12 is connected to drive the speed reducer and the roller 11.

The rollers 11 in pedestals 10 immediately adjacent the booth 5 have similar shaft assemblies 16 and 17, respectively, extending parallel to and spaced from the shaft assembly 13 adjacent the open ends of booth 5, Similar chain and sprockets 18 couple the outer ends of shaft assemblies 16 and 17 to the shaft assembly 13 and establish synchronous rotation of the respective rollers 11.

The other rollers 11 spaced outwardly from booth 5 are interconnected to the corresponding driven roller 11 adjacent booth 5 by chain and sprocket units 19.

Figure 4:
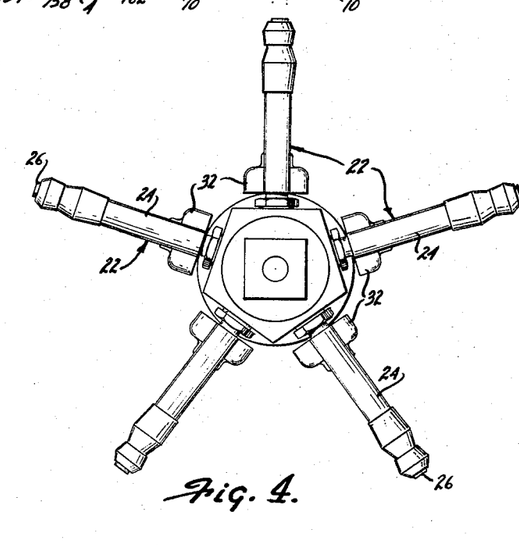
FIG. 4 is an end elevational view showing the circumferential distribution of the spray guns shown in FIG. 1.
Figure 5:
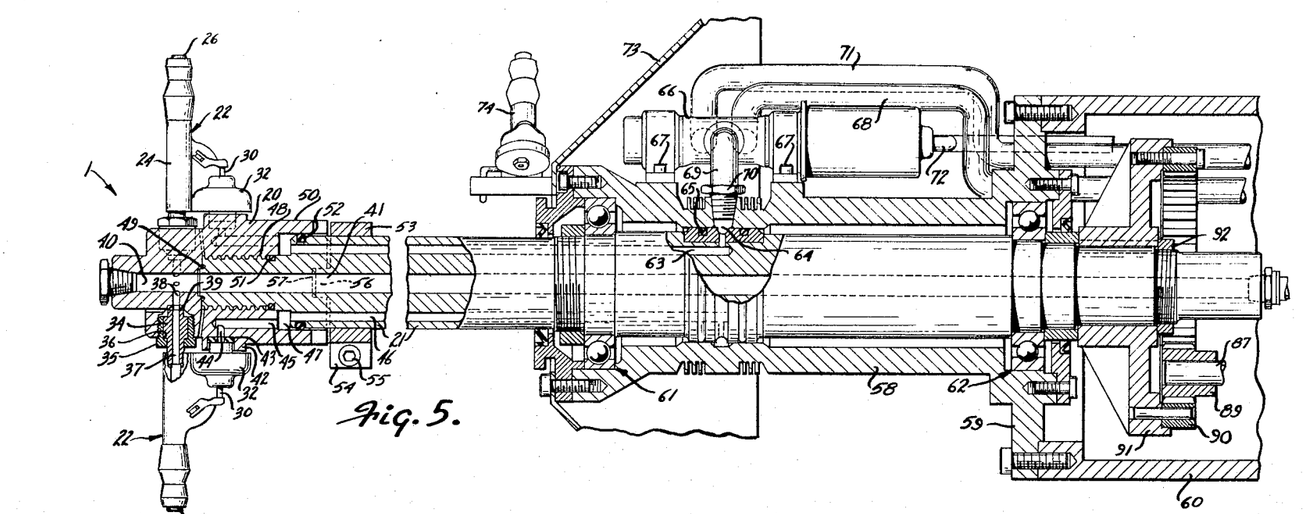
FIG. 5 is an enlarged vertical section of the rotary head unit.
Figure 6:
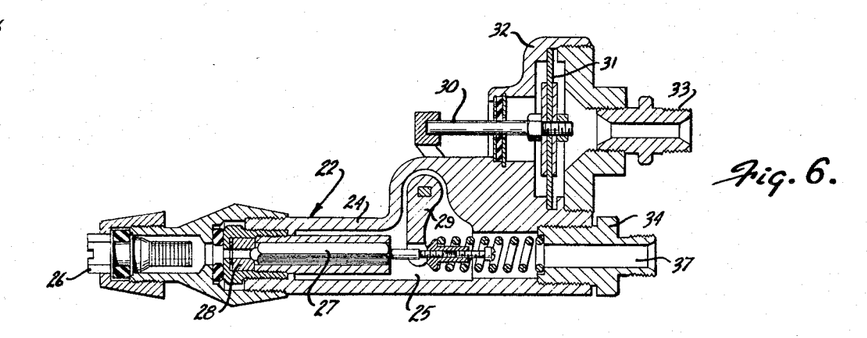
FIG. 6 is an enlarged sectional view of a spray gun shown in the previous figures.
Figure 7:
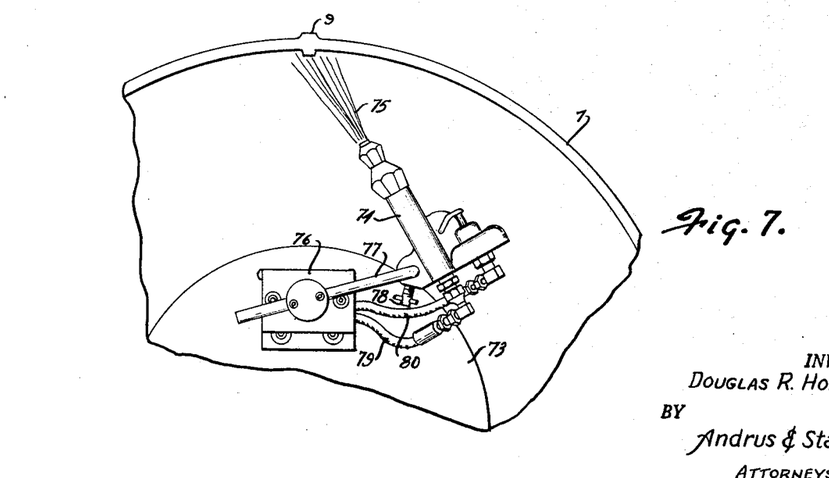
FIG. 7 is a vertical fragmentary section taken on line 7—7 of FIG. 1.

Referring particularly to FIGS. 4–6, the rotating spraying unit 1 includes a quick-change head 20 which is releasably fixed to the forward end of a rotating shaft 21. A plurality of circumferentially distributed spray guns 22 are secured to the head and establish a radially directed paint spray 23 from each.

The spray guns 22 are a high pressure and airless type unit which is actuated however by an air-operated trigger control or the like. Generally, each gun 22 includes a gun barrel 24 terminating in an axial fluid passageway 25 which is connected to a pressurized source of paint, as subsequently described. A spray tip 26 is releasably secured to the outer end of the gun barrel 24 and selected to give a desired pattern to the paint spray 23. A needle valve 27 is urged into engagement with a valve seat 28 in the passageway 25 for opening and closing thereof. A trigger 29 is coupled to the needle valve 27 for the selective opening and closing of the valve and thus the passage way 25. In the illustrated embodiment of the invention, a push rod 30 is coupled at one end to the trigger 29 and at the opposite end to an air actuated diaphragm 31 which forms one wall of a diaphragm chamber 32. An air inlet 33 is connected to the diaphragm chamber 32 for selective actuation of the push rod 30 and the associated needle valve 27.

The gun barrel 24 is properly secured as a part of the quick-change head 20 through a threaded support pin 34 which threads into the inner end of the barrel and projects axially outwardly into a suitable recess on the peripheral portion of the head. A guide and clamp nut 35 is threaded into the recess of the head 20 and engages a shoulder 36 on the support pin 34 to securely clamp the gun 22 within the recess and fixed to the head 20 for rotation therewith. A radial passageway 37 in the support pin 34 mates with the passageway 25 of the gun barrel 24 and a radial passageway 38 in the head 20. A sealing washer 39 of nylon or other suitable material is disposed and clamped between the inner end of the pin 34 and the base of the recess to form a liquid-tight joint from passageway 38 in the head 20 to the passageway 37 in the pin 34. Passageway 38 terminates in an axial passageway 40 in the head 20. The passageway 40 extends through the head 20 in end-to-end alignment with an axial passageway 41 in the rotating shaft 21 to which the head 20 is secured. The paint for spray 23 is transferred through the passageways just described at high pressures normally in the order of 2200 to 2400 pounds per square inch when the needle valve 27 is opened.

The barrel 24 is secured to the head 20 with the control diaphragm 31 aligned with and telescoped into an annular boss 42 on the head 20 immediately adjacent gun 22. A sealing washer 43 of soft neoprene or the like is clamped between the base of the boss 42 and the underside of the recess as a result of the mounting of the gun barrel 24 on the head 20 by the support pin 34. A radial passageway 44 in the head 20 and washer 43 is aligned with the air inlet 33 to the diaphragm chamber 32. The radial passageway 44 terminates in a longitudinal passageway 45 and is coupled to a plurality of longitudinal air passageways 46 in the shaft 21 by an annular chamber 47 defined by a shoulder on the end of shaft 21 and the base of a recess in the head 20.

The head 20 is a generally tubular member which is threaded onto a correspondingly threaded end portion of the shaft 21 to form a threaded joint 48. An O-ring seal 49 of butyl or other suitable material is disposed within a suitable recess in the end face of the shaft 21 and forms a liquid-tight seal between the end of the shaft 21 and the adjacent base portion of the head 20. An outer flange portion 50 is provided on head 20 and is telescoped over the outer diameter of the shaft 21 to define the annular chamber 47. An O-ring seal 51 is disposed in a recess in the shaft 21 within the telescoped portion 50 to form an air-tight seal. A similar O-ring seal 52 is disposed between the reduced portion of the shaft 21 and the inner end of the threaded joint 48 to provide an air-tight seal adjacent the outer end of the chamber 47. Consequently, the air from the shaft air passageways 46 is directed into the air passageways 45 in head 20.

A split lock ring 53 is slid onto the shaft 21 adjacent the telescoped portion 50 of the head 20 and releasably clamped in place by radial ears 54 and a nut and bolt assembly 55. A pair of locking projections 56 is integrally formed on diametrically opposite portions of the split lock ring 53 and extends axially in the direction of the head into selective engagement with a pair of correspondingly formed locking slots 57 on the outer end of the adjacent head flange portion 50. The interengagement of projections 56 and slots 57 positively lock the head 20 against rotation relative to shaft 21 during rotation thereof.

To remove the guns 22 for replacement, cleaning and the like, head 20 is removed as a unit by first releasing the ring 53 and withdrawing it from the head on shaft 21. The head is then rotated as a unit and removed from shaft 21. The unitary head structure reduces the down time for cleaning and servicing and facilitates maximum accuracy of gun positioning and alignment. In operation, head 20 is rotatably fixed to the rotating shaft 21 which, in turn, is rotatably supported on the outer end as a part of the boom assembly 2, as follows.

Referring particularly to FIG. 5, a shaft 21 is rotatably supported in a shaft housing 58 having a rear wall or flange 59 which is bolted to the outer end of a drive unit 60 forming a part of the boom assembly 2. The housing 58 is generally an elongated tubular member through which the shaft 21 extends and is rotatably supported by axially spaced ball bearing units 61 and 62 for respective connection to the head 20 and to a drive assembly within the drive unit 60.

The coating material passageway 41 of shaft 21 extends completely through the shaft. The air passageways 46 however terminate in radial passageway 63 within the forward portion of the housing 58. Cooperating and aligned recesses on the shaft 21 and the housing 58 define an annular air chamber 64 sealed at opposite sides by O-ring seals 65. A three-way air control valve 66 is mounted on the top of the housing 58 by suitable bolt units 67. A main air supply line 68 is coupled to a pressurized air source, not shown, and is connected through the valve 66 to an air operating line 69 which is connected by a coupling unit 70 to the annular air chamber 64. A by-pass line 71 is also connected to the valve 66 and extended backwardly into the drive unit 60 to by-pass the incoming air when the valve 66 is closed. An air control line 72 is connected to the valve 66 which is biased to a normal position by a spring or the like, not shown, and connected to the main line 68 for selective supplying of the incoming air to chamber 64 and via passageway 63 to regulators 32 for controlling the action of guns 22.

The locating of the control valve 66 on the housing 58 provides a minimum passage length between the valve and the rotating guns 22 and creates very rapid and optimum gun operation.

A baffle 73 is attached to outer end of housing 58 and projects radially and axially away from the guns 22 and prevents syphoning of air from the pipe 7.

Figure 8:
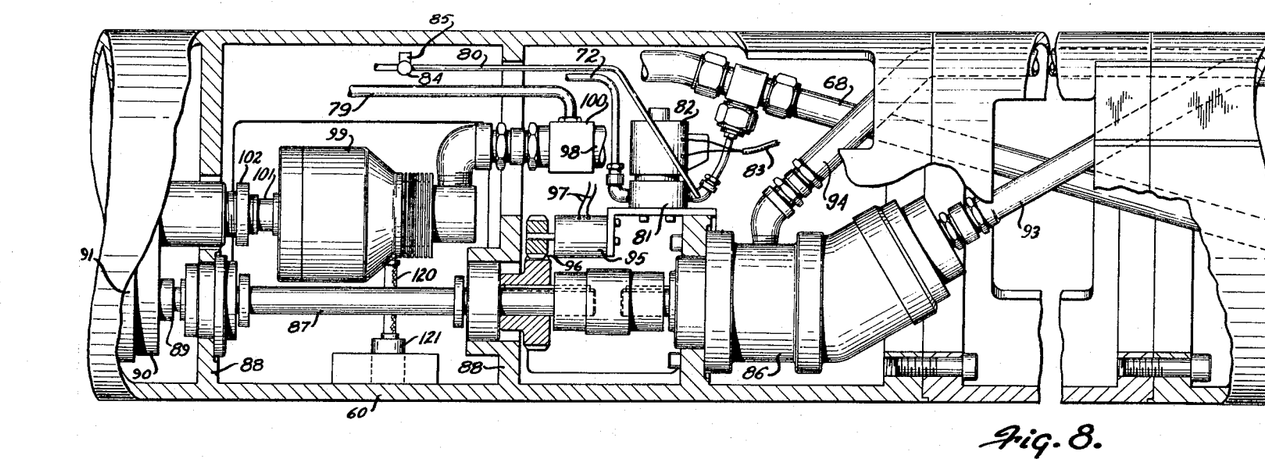
FIG. 8 is a side elevational view of a control and drive unit with parts broken away and sectioned to show details of construction.

A single auxilary spray gun 74 is fixedly secured immediately in front of the baffle 73 to housing 58 and arranged to direct a paint spray 75 onto the inner ridge of weld 9. A gun holder 76 is secured to housing 58 and includes a forward projection having an opening within which a support rod 77 is releasably clamped. The rod 77 extends laterally and slightly upwardly with the outer end bent at 90° and clamped in an opening in the gun 74 by a lock shaft 78. The rod 77 is positioned in holder 76 and the gun 74 is angularly locked on the bent end of rod 77 for optimum positioning of gun 22. A paint line 79 and an air line 80 for gun 74 extend through an opening in baffle 73 and are interconnected for proper operation of gun 22 to the main paint line and air line, as shown in FIG. 8. The spray gun 74 is necessary where the viscosity of the paint is relatively high and the flow characteristics are such that the areas forming the inner ridge of weld 9 may not be adequately covered. The spray gun 74 permits automatic and simultaneous application of an additional coat of the paint to the area of weld 9.

As most clearly shown in FIG. 8, a solenoid-operated valve control 81 is mounted within the drive unit 60 and has its output connected to the air control line 7 of FIG. 5. The inlet side of control 81 is connected to the main air supply line 68. A solenoid 82 forming a part of the valve control 81 has incoming power lines 83 extending rearwardly through the boom assembly 2 to an automatic control panel for remote control of the air control valve 66 and the guns 22.

The air line 80 is connected to the air supply line 68 at the inlet side of the valve control 81. A separate solenoid-operated valve 84 is inserted in line 80 and has separate power leads 85 for selective operation of the auxiliary spray gun 74.

The shaft 21 is rotatably driven by a hydraulic motor 86 which is mounted within the drive unit 60 and connected thereto, as shown in FIGS. 5 and 8 of the drawings.

A drive shaft 87 is rotatably supported within the unit 60 by spaced bearing walls 88 and is coupled to the mechanical output of the hydraulic motor 86. The outer or free end of shaft 87 carries a pinion 89 keyed or otherwise fixed thereto. The pinion 89 meshes with ring gear 90 which is carried and forms a part of a ring gear hub 91 which is fixed to the shaft 21 by a key. A thrust ring bearing lock nut 92 is threaded onto the end of the shaft 21 and axially locks the gear hub 91 in position.

Motor 86 is controlled by an incoming liquid source line 93 and a drain line 94 which project rearwardly through the boom assembly 2 to a suitable source of pressurized hydraulic fluid for motor operation. The hydraulic motor 86 is a compact unit having a high, constant output torque sufficient to rapidly bring the rotating head 20 to a desired speed and to maintain a constant and closely regulated speed. The motor 86 may therefore be readily mounted within the boom assembly 2 without interfering with the necessary paint, air and electrical components or the movement of the pipe 7 with respect to the boom assembly 2.

In the illustrated embodiment of the invention, the speed of the rotating head 20 is continuously recorded by a small tachometer 95 which is mounted within unit 60 and coupled to the drive shaft 87 through a small pickup gear unit 96. Signal lines 97 from the tachometer 95 extend rearwardly through the boom assembly 2 to a central control panel, not shown, for registering the speed of the guns 22. The output of the tachometer 95 is connected to a suitable recording dial, not shown, on an operator's panel, not shown. This measurement of head speed will vary as the setting of the hydraulic flow to motor 86 is changed to obtain the desired speed. In this manner, rotational speed of the guns 22 is remotely controlled for establishment and transmission of an even and uniform spray of paint 23 onto the pipe 7.

In the illustrated embodiment of the invention, a main paint line 98 is connected to the end of the shaft 21 within the drive unit 60 through a high pressure rotary union 99 and extends outwardly through the boom assembly 2. The paint line 79 for the auxiliary spray gun 74 is connected to the line 98 by suitable coupling 100.

Figures 9, 10:
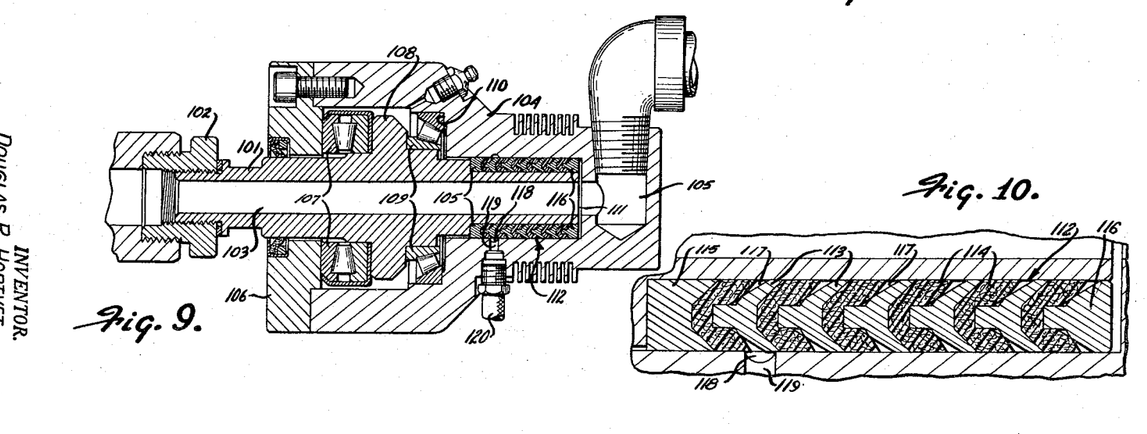
FIG. 9 is a vertical section through a high pressure unit for connecting of a paint line to a rotating spray unit.
FIG. 10 is an enlarged fragmentary view of a portion of a seal unit shown in FIG. 9.

Referring particularly to FIGS. 8 and 9, the high pressure rotary union 99 is shown in more detail and includes a coupling spindle 101 connected to the shaft 21 by an adaptor nut 102 which threads onto the end of the spindle 101 and into the end of the shaft 21. The coupling spindle 101 includes a central passageway 103 in alignment with the passageway 41 of shaft 21.

The spindle 101 is rotatably mounted within a hollow housing or body 104 having an integral back wall. An L-shaped passage 105 in the back wall is connected with the passageway 103 with radial portions to which the incoming paint line 98 is connected. The forward end of the body 104 is closed by a suitable cap 106 which is bolted or otherwise secured thereto. The spindle 101 is rotatably mounted within the body by a thrust roller bearing 107 clamped between cap 106 and annular projection 108 on the spindle 101. A cone roller bearing 109 is clamped between the opposite side of the projection 108 and a locating wall 110 within the body 104. With the spindle 101 thus clamped within the body 104 by cap 106, the inner end of the spindle is spaced from the base of the opening or recess in the body as at 111 and transmits the pressure of the incoming paint to a high pressure rotary seal 112 which is disposed within an annular chamber formed between the inner end of the spindle 101 and the body 104 by a reduced portion of the inner end of the spindle.

The rotary seal 112 of FIGS. 9 and 10 consists alternately of annular ring packing 114 and annular inner glands 113 which are held between an inboard gland 115 abutting the shoulder formed by the reduced portion of spindle 101 and an annular outboard gland 116 encircling the end of the spindle 101. The annular packings 114 are preferably formed of a glass-filled teflon and have a generally U-shaped cross-sectional area with a truncated base and a Y-shaped recess defined by a square stem and arms which flare outwardly parallel to the sides of the truncated base. The packings 114 open toward the outboard gland 116 which has a base corresponding to the recess in the packing. The inner glands 113 have a generally Y-shaped cross-section with a rectangular stem mating with adjacent recess of a packing 114. The arms of glands 113 flare outwardly correspondingly to and mating with the truncated base of the adjacent packing 114. The inner or opposite surface of the arms of glands 113 however is flared outwardly at a somewhat greater angle to define a space 117 between the arms and the adjacent packing 114. The outboard gland 116 has an inner Y-shaped surface mating with the recess in the adjacent packing 114 and a flat outer surface generally in the plane of the spindle.

In operation, the paint under high pressure enters space 111 between spindle 101 and the inner base portion of the body 104. The pressure acts on the outboard gland 116 to compress the packing 114 as the pressure increases and creates a tight liquid rotary seal between the body 104 and the spindle 101. The special glass filled teflon packings 114 prevent undue loading of the spindle 101 and allow the shaft 21 to rotate relatively freely under the action of the high torque hydraulic motor 86.

A leak detection groove 118 is formed in the body 104 immediately adjacent the inner end of the rotary seal and in alignment with a radially extending leak detecting outlet 119. A signal tube 120 is connected to the outlet 119 and extends downward to a glass container 121 where any leak in the rotary union 99 will be immediately detected. The pressure of the incoming paint establishes and maintains the rotary seal 112 permitting the use of the necessary high painting pressures at the nozzle tips 26 of guns 22 without serious danger of leakage of the paint from the union 99. The present invention has been employed with paint pressures in excess of 2400 pounds per square inch without leakage.

The above described drive unit 60 with the hydraulic motor 86, rotary union 99 and the other components are mounted as a part of the boom assembly 2 on the outer end of a boom stabilizing unit 122 which is more fully shown in FIGS. 11-15 inclusive.

Figure 11:
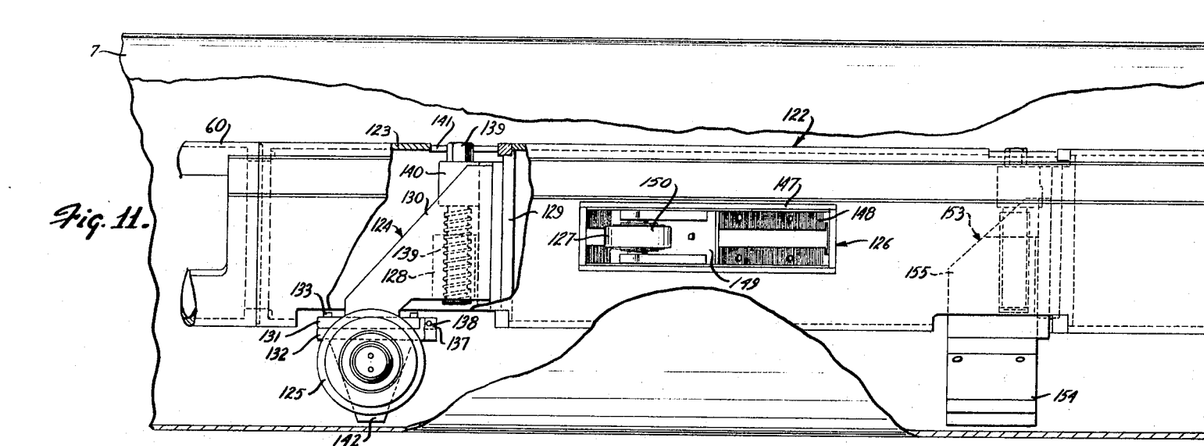
FIG. 11 is a side elevational view of the boom stabilizing unit shown in FIG. 1 with parts broken away to show details of construction.

Referring particularly to FIG. 11, the stabilizing unit 122 includes a tubular housing 123 to which the housing of the drive unit 60 is secured. A vertical stabilizing assembly 124 having a pair of laterally spaced wheels 125 is provided with the wheels riding on the lower portion of the pipe 7 as it passes over the boom assembly 2. The periphery of each of the wheels 125 is tapered to conform generally to the curvature of a pipe 7. A lateral or horizontal stabilizing assembly 126 is mounted within the housing 123 in axially spaced relation to the vertical stabilizing assembly 124 and includes a pair of oppositely mounted wheels 127 which ride on the pipe 7 in a horizontal plane through the center of the pipe.

Figure 12:
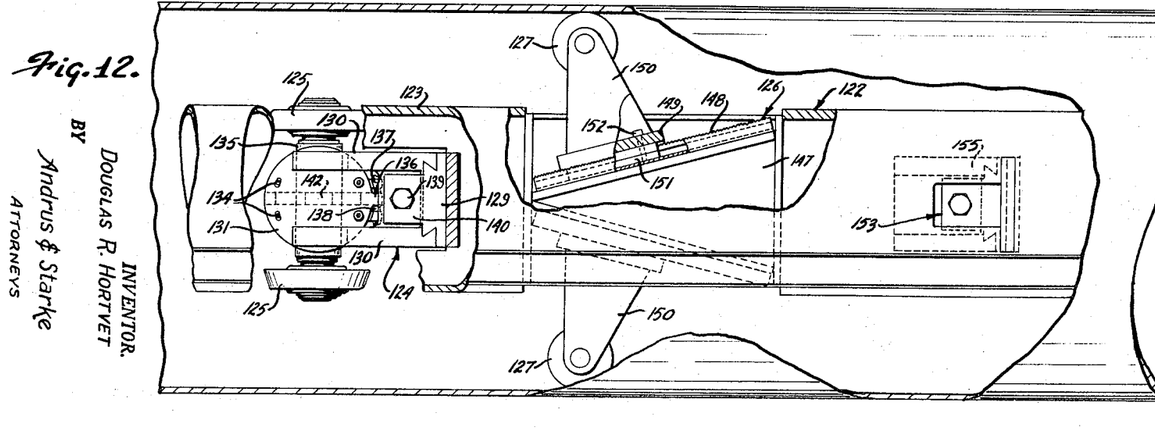
FIG. 12 is a top elevational view of FIG. 11 with parts broken away.
Figure 13:
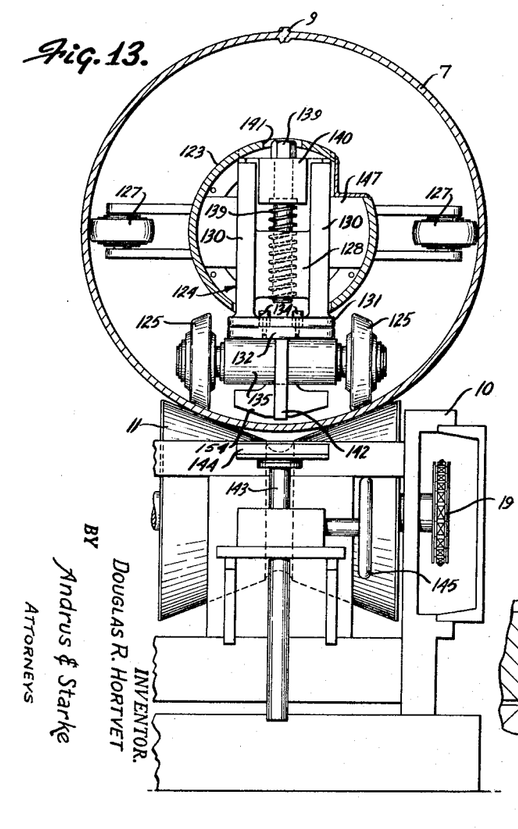
FIG. 13 is a vertical section taken on line 13—13 of FIG. 1.

The vertical stablizing assembly 124 is shown in FIGS. 11-13 and includes a block weldment or carriage 128 which is slidably mounted within a vertical guide 129 within the housing 123. The carriage 128 includes a pair of lateral side walls 130 with the lower ends thereof projecting forwardly and downwardly. A circular base plate 131 is welded or otherwise secured to the lower end of the walls 130. A shaft and wheel support 132 in the form of the corresponding plate is releasably secured to the base plate 131 by a plurality of attachment bolts 133 which pass downwardly through elongated arcuate openings 134 in the plate 131. Openings 134 are most clearly shown in FIG. 12 wherein the heads of a pair of bolts 133 have been removed.

A pair of shaft journals 135 are welded to the under surface of support 132 and carry the shaft for wheels 125.

The bolts 133 and arcuate openings 134 in the circular base plate 131 permit limited angular positioning of the wheels 125 about a vertical axis. After proper positioning thereof, they are locked in position as follows. An ear 136 projects radially from the back edge of the plate 131 between a pair of L-shaped upstanding arms 137 which are secured to the shaft support 132. Small set screws 138 are threaded through the arms 137 and bear on opposite sides of the ear 136 to releasably and angularly lock the support 132 to the base plate 131 after the desired angular positioning thereof has been established.

A vertical positioning bolt 139 is threaded into the carriage 128 and includes an upper unthreaded portion journaled within an upper thrust block 140 which is secured to and forms a part of the guide 129 and thus to the stabilizing housing 123. Rotation of the bolt 139 causes the carriage 128 to move vertically and reposition the wheels 125 in accordance with the diameter of the pipe 7 to be coated. Access opening 141 is provided in the top of the stabilizing housing 123 for manual rotation of the bolt 139 with a suitable tool, not shown, and changing the vertical position of the wheels 125.

Generally, it has been found that the positioning of the wheels 125 through the described carriage 128 arrangement is satisfactory for pipes varying up to four inches in diameter. For greater changes however, various carriages 128 are provided each of which is adapted to cover a preselected range of four inches. Thus, when it is desired to change to a greater or lower range in pipe size, the apparatus is shut down and carriage 128 removed by unthreading of the bolt 139. A new carriage 128 is mounted in the guide 129 and the bolt 139 threaded into the follower portion to properly position the wheels 125.

A vertical support plate 142 is secured to the wheel support 132 between the shaft journals 135 and projects downwardly below the lower edge of the wheels 125.

A support jack 143 is secured to a drive pedestal 10 immediately adjacent and in alignment with the vertical support plate 142. The jack 143 includes a horizontal platform 144 which is vertically coupled to and positionable through operating hand wheel 145 through a suitable screw and worm, not shown, or other suitable connection.

The support jack 143 is used in unison with a similar rear jack 146 mounted in rear support unit 3 to raise or lower the boom assembly 2. In the event the disappearing boom support 4 fails to raise on withdrawal of pipe 7, the boom will pivot down and contact platform 144 of the support jack 143 which is usually set approximately one inch below the pipe.

The horizontal stabilizing assembly 127 is mounted axially rearwardly of the vertical stabilizing assembly 124 and includes a pair of wheels 127 similarly mounted for rotation in a horizontal plane in engagement with the adjacent pipe 7. For purposes of simplicity and clarity of explanation, the mounting of the upper wheel 127 in FIG. 12 is described in detail, with corresponding numbers applied to the mounting for the opposite and lower wheel 127.

Referring particularly to FIGS. 12 and 13, a pair of vertically spaced horizontal walls 147 are secured to corresponding edges of an opening within the sides of housing 123. A vertical rack 148 is bolted or otherwise secured to a support plate 149 which is mounted between the walls 147. The rack 148 extends axially from the center of the housing 123 rearwardly and outwardly, as most clearly shown in FIG. 12, to provide an inclined or angularly related surface along which a wheel carriage 150 for the wheel 127 is selectively positionable. The wheel carriage 150 has its bottom wall serrated to mate with the rack 148 for selective fixed positioning therebetween. A T-bar 151 slides with the carriage 150 within a central groove in rack 148 with the stem projecting outwardly into a groove in carriage 150. A cap screw 152 extends through suitable openings in the base of carriage 150 and threads into suitably tapped openings in the T-bar 151 for releasably clamping of the carriage 150 to the rack 148.

When it is desired to move the wheels 127 inwardly or outwardly, cap screws 152 are loosened which allows relatively free movement of the wheel carriages 150. When the carriages 150 are properly positioned, the cap screws 152 are again drawn up and securely clamp the carriages 150 and the attached wheels 127 in the desired position.

A forward boom support 153 is also provided in the boom stabilizing unit 122 for cooperative action with the disappearing boom support 4 when the pipe 7 is removed from the assembly. Generally, the boom support 153 includes a lower block member 154 which is secured to the lower end of a carriage 155 for vertical positioning. The carriage 155 is slidably mounted to housing 123 in a manner corresponding to the previously described mounting of the carriage 128 for wheels 125. Generally, block member 154 is held in a raised position out of the path of a pipe 7 when the boom assembly 2 is supported within the pipe by the vertical wheels 125. In the absence of the pipe 7, the boom assembly 2 remains horizontal with a wheel 156 of the disappearing boom 4 in contact with lower block member 154.

The illustrated boom support 4 includes the supporting wheel 156 journaled within the apex of a pair of identical triangular plates 157 for vertical positioning of wheel 4. Plates 157 are pivotally mounted to the upper portion of a boom pedestal 158. An air cylinder unit 159 is mounted in the pedestal 158 and includes a piston, not shown, connected to a positioning rod 160 projecting from a cylinder 161 and pivotally secured to the third apex of the triangular plates 157. The air cylinder 159 is connected to any suitable source of operating air by an adjustable solenoid valve 162 and is controlled in response to movement of the pipe 7 to raise and lower the wheel 156 into engagement with the supporting block member 154. Valve 162 is preset to raise wheel 156 to hold the boom assembly 2 in accurate alignment with an incoming pipe 7. As the pipe 7 moves inward onto the boom assembly 2, it engages a proximity switch 163 connected in the circuit for valve 162 and operative to lower the wheel 156 from the path of the pipe 7 for a non-obstructed telescoping of the pipe 7 and the boom assembly 2.

The boom assembly 2 is constructed to accept a maximum length of pipe by provision of a structural boom arm 164 between the stabilizing housing 123 and the tail support 3. The various hydraulic lines, paint lines, electrical control and signal lines heretofore described extend backwardly through the boom assembly 2 and boom arm 164 to protect them from the surrounding apparatus and tools.

The boom assembly 2 is pivotally carried by the tail support 3 to allow limited angular positioning in the vertical direction and includes jack 146 for vertical positioning and accommodating various diameter pipes.

The ring assembly 6, shown in FIG. 1, includes a rotating drum 165 to intercept the paint spray 23 immediately prior to the introduction of the pipe 7 and immediately after the pipe 7 is withdrawn from the drum 165 and the spray booth 5.

An outer chain drive 166 couples the drum 165 to a small drive motor 167. The drum 165 is rotatably supported by a V-grooved wheel 168 and a smooth surfaced wheel 169 riding in corresponding tracks 170 and 171 on opposite sides of the drive 166. The drum 165 is continuously rotated during the operation of the spray guns 22 to continuously carry the paint downwardly into collector pans 172 positioned immediately below the bottom edges of the drum. A scraper blade 173 is mounted in scraping engagement with the bottom of the drum 165 to continuously divert the paint from the drum into the collector pans 172.

The present invention is readily adapted to fully automatic operation by the proper selection of proximity switches, photoelectric systems and other control means associated with the path of pipe 7 and the several drive and control components heretofore described.

The operator is further provided with readings or signals related to the proper functioning of the apparatus. The tachometer 95, for example, provides a signal of the rotational speed of head 20 and the attached guns 22. Similarly, a small tachometer 174 is coupled to a small wheel 175 which is pivotally mounted adjacent the underside of pipe 7 by an arm 176 secured to an adjacent pedestal 10. Tachometer 174 provides a signal proportional to the linear speed of pipe 7. This permits the operator to immediately detect any variation in the preset rotary speed of guns 22 and linear speed of pipe 7, which relation is extremely important to producing a high quality coating 8 of uniform thickness and appearance.

The operation of the illustrated embodiment of the invention is summarized as follows.

The pipe 7 is transferred to the conveying rollers 11 to the left of booth 5, as viewed in FIG. 1 and the hydraulic motor 12 is actuated to drive rollers 11 and telescope the pipe over boom assembly 2 and stops, as shown in FIG. 1. The guns 22 are sealed or closed and stationary during this step. The hydraulic motor 86 within drive unit 60 is actuated and rapidly brings the head 20 and attached guns 22 up to operating speed. The hydraulic motor 12 is then actuated to reverse the movement of pipe 7 and the solenoid-operated valves 81 and 84 are energized to open the respective air lines 69 and 80 and open the guns 22 and 74. The paint sprays 23 and 75 are collected by the rotating drum assembly 6 until the pipe 7 enters and encloses the respective sources. The pipe 7 traverses the head 20 and the uniform coating 8 is applied to the interior of the pipe 7.

Applicant has found that for optimum operation of the high pressure sprayless application of an epoxy resin based paint, a distance of 6½ to 7½ inches should be maintained from the spray tip 26 to the internal pipe surface. The guns 22, as shown in FIGS. 1 to 4, are selected in the middle of the largest diameter pipe 7 to be coated and may thus be employed with pipes varying by two inches in diameter about this base size, or a total of four inches.

Smaller diameter pipes are interiorly coated with the same apparatus by replacing head 20 with a new head unit locating the nozzles inwardly. Preferred constructions for the next two lower ranges are shown in FIGS. 16–18.

Figure 16:
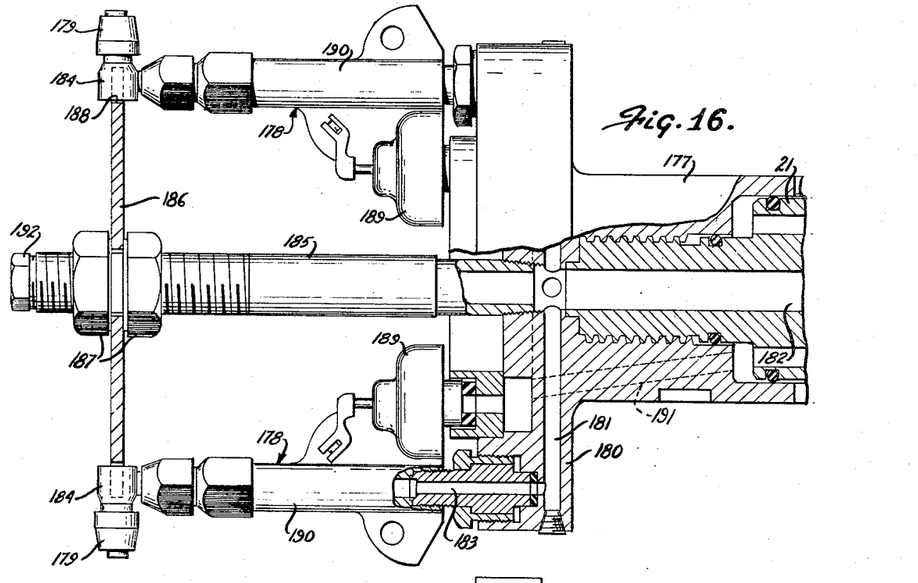
FIG. 16 is a vertical section of a removable spray gun head unit for a smaller diameter tubular member.
Figures 17, 18:
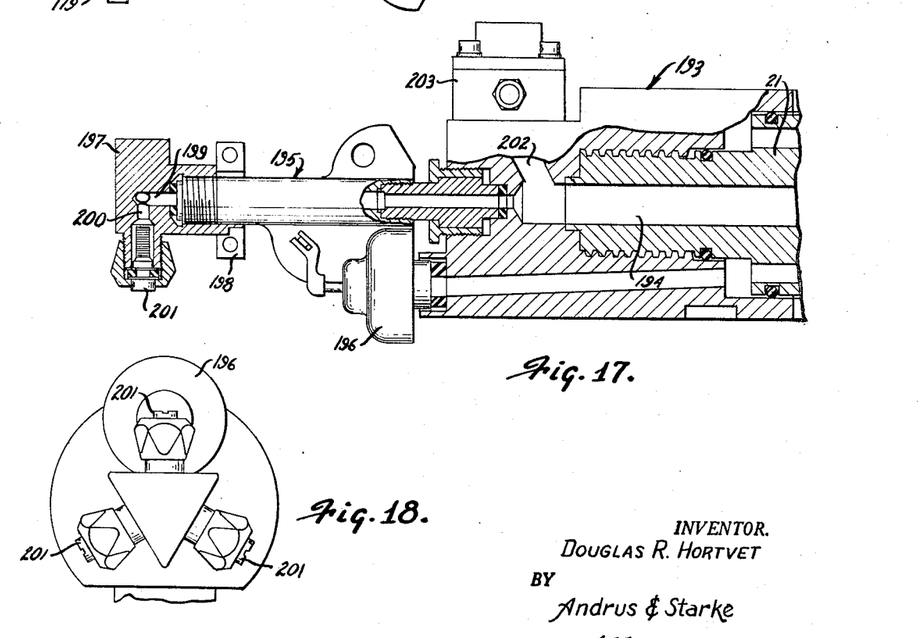
FIG. 17 is a vertical section of a removable spray gun unit for a minimum size diameter tubular member.
FIG. 18 is an end view of the gun shown in FIG. 17.

Referring particularly to FIG. 16, a rotating head 177 is shown coupled to the shaft 21 in the same manner as head 20 in FIG. 5. Four airless spray guns 178 corresponding to guns 22 are secured to and project axially outwardly from head 177 to properly locate spray tips 179 which are secured to the outer ends thereof.

Head 177 includes an outer flange 180 having radial passageways 181 interconnecting a center axial passageway 182 to axial passageways 183 in the outer periphery of the flange. The guns 178 are secured in the same manner as previously described for guns 22 with the internal paint passageways, not shown, aligned and connected with passageway 183.

The spray tips 179 include an L-shaped mounting junction 184 secured to the axially projecting guns 178 and directing the spray outwardly radially toward the pipe 7.

A head shaft extension 185 is secured to the head and projects outwardly past the gun spray tips 179 and is exteriorly threaded on the outer end. A support plate 186 is secured on the outer end of extension 185 by suitable lock nuts 187 in alignment with the spray tips 179 which rest within notches 188 to radially support the guns 178.

The operating air diaphragm chamber portions 189 of guns 178 are located inwardly of the gun barrels 190 and connected to air passageways 191 in head 177 as previously described for guns 22.

The guns 178 are mounted to properly locate the spray tips 179 for the intermediate diameter of the pipe sizes to be coated therewith in accordance with the previous discussion of the location and mounting of guns 22 to maintain the optimum spacing 6½ to 7½ inches.

The shaft extension 185 is a tubular member to form an extension of the central axial passageway 182 of head 177 to allow cleaning of the system. The outer end of extension 185 is normally capped as by a cover 192.

The smallest diameter pipe range is coated by a rotating head 193 constructed as shown in FIGS. 17 and 18. Head 193 is secured to the rotating shaft 21 in the same manner as heads 20 and 177. The head 193 includes a central axial passageway 194 aligned with the shaft passageway 41. A single airless spray gun 195 corresponding to previously described guns 22 and 178 is secured to the outer end of passageway 194 in the manner of the mounting of guns 22 and 178. An air operated diaphragm chamber 196 of gun 195 is also similarly coupled to an air passageway in the head 195 for operation of the gun.

A spray nozzle adaptor 197 is threaded onto the outer end of the gun 195 and locked in place by a locking clamp 198. The adaptor 197 includes a central axial passageway 199 and three equicircumferentially spaced radial passageways 200. A spray tip 201 is secured in the outer end of the passageway 200.

The adaptor 197 is arranged and constructed to properly locate the spray tips 201 to maintain the optimum spacing 6½ to 7½ inches between tips 201 and the interior surface of pipe 7.

The head 193 includes a clean-out passageway 202 having a closure valve 203 secured to the exterior of the head to permit cleaning out of the lines ahead of the spray gun 195.

Figures 14, 15, 19:
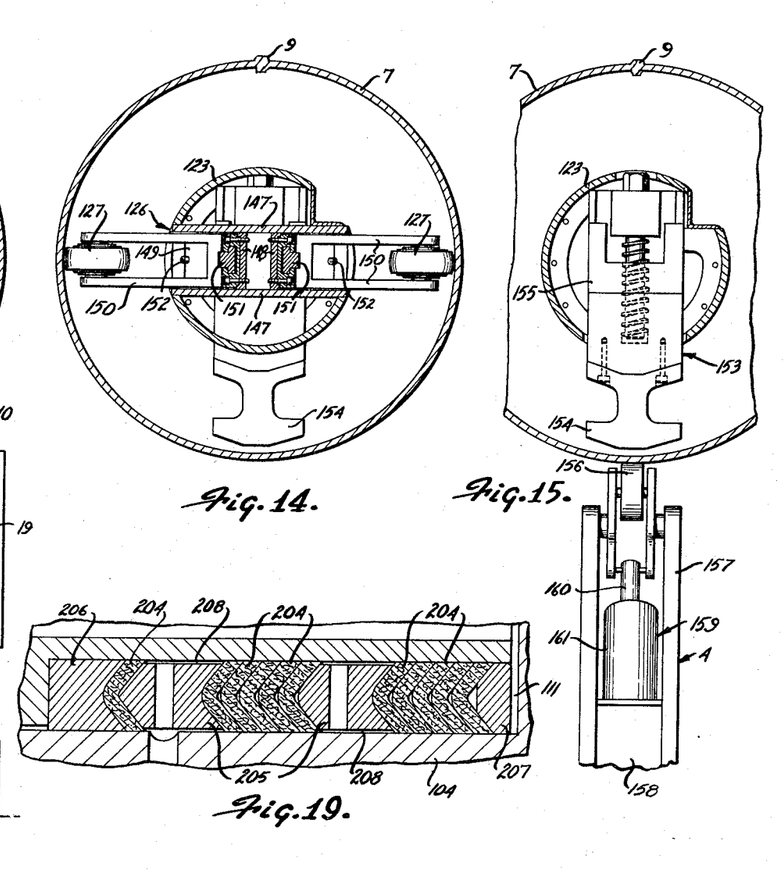
FIG. 14 is a vertical section taken on lines 14—14 of FIG. 1.
FIG. 15 is a vertical section taken on lines 15—15 of FIG. 1.
FIG. 19 is an enlarged fragmentary view similar to FIG. 10 showing an alternative sealing arrangement.

In FIG. 19, an enlarged fragmentary sectional view of an alternative high pressure seal for use in the rotary union shown in FIG. 9, has corresponding elements in the two figures which are similarly numbered. In FIG. 19, a plurality of annular packings 204 are employed having a conventional V-shaped or Chevron cross-section. The packings 204 are arranged in two groups of five continuous packings and one single packing axially spaced within the recess between the spindle 101 and the body 104, previously described. An inner gland 205 separates the respective groups with the single packing arranged adjacent the innermost end of the spindle 101 with the groups of five axially spaced therefrom and from each other. An inboard gland 206 and an outboard gland 207 are similarly provided. The inner glands 205 have a cross-sectional dimension slightly less than the sealing recess provided between the periphery of the spindle 101 and the interior of the body 104 to provide annular spaces 208 encircling the inner glands 205. The one annular space 208 is aligned with the leak detecting grooves 118 and allows any paint which leaks through the rotary seal to pass outwardly through the signal tube 120 to indicate the leakage.

The embodiment of the seal illustrated in FIG. 19 generally operates in the same manner as the previously described embodiment. The pressure of the incoming paint is transmitted through the spacing 111 to the outboard gland 207 to firmly hold the packing in sliding engagement with the adjacent surfaces of the spindle 101 and the body 104.

The present invention provides an internal applicator for high speed application of a coating to a pipe member. The structure of the present invention provides optimum control of the rotating head and conveyor speed and the introduction of the paint to the guns for creating a uniform thickness of a high quality coating on the pipe member. The apparatus is readily maintained and is quickly adapted to accommodate a great variety of pipe diameters.

Various modes of carrying out the invention are contemplated as being within the scope of the following claims particularly pointing out and distinctly claiming the subject matter which is regarded as the invention.

I claim:

1. Apparatus for coating the interior surfaces of tubular members comprising,
    (a) a boom assembly supported at one end and including a mounting means supporting said boom against axial movement,
    (b) a vertically movable support disposed adjacent the opposite outer end of the boom assembly and movable to a raised position aligning the boom assembly with an incoming member,
    (c) a stabilizing unit secured as a forward part of the boom assembly and having guide means for engaging the interior surface of the member and supporting the outer end of the boom assembly on the member,
    (d) a rotating head rotatably mounted on the outermost end of the boom assembly,
    (e) at least one airless spray gun fixed on the head and being remotely controlled,
    (f) an hydraulic motor mounted on the outer end of the boom assembly and coupled to rotate said head, said hydraulic motor being of a constant torque and variable speed construction to rapidly accelerate the head to a selected operating speed,
    (g) a conduit means for the coating material carried by the boom assembly, and
    (h) a rotary union disposed adjacent the outer end of the boom assembly and interconnecting the rotating head to the fixed conduit means.

2. A spraying apparatus for coating the interior surfaces of tubular members with coating of viscous material comprising,
    (a) a boom assembly pivotally supported at one end,
    (b) a vertically movable support disposed adjacent the forward portion of the boom assembly and movable to a raised position to align the boom assembly with an incoming member,
    (c) means for telescoping a tubular member onto and from the boom assembly,
    (d) a stabilizing unit secured as a forward part of the boom assembly and having vertically adjustable guide wheels and horizontally adjustable guide wheels for engaging the interior surfaces of the member and supporting the boom assembly on the member, (e) a shaft housing mounted as a forward portion of the boom assembly, (f) a rotating head shaft mounted within the housing and extending forwardly thereof and terminating in a reduced threaded portion, said shaft having a central axial paint passageway and a series of circumferentially distributed outer axial air passageways, (g) a rotating head threaded onto the threaded end of the rotating shaft and having a central paint passageway abutting the paint passageway of the shaft and having an outer portion telescoped over the shaft adjacent the threaded portion to define an annular air connecting air passageways in the head with the air passageways in the shaft, (h) at least one airless spray gun fixed on the head in operative connection to said paint passageway and having an air actuated trigger means connected to an air passageway in the head, (i) a remotely controlled air control valve mounted upon said housing with an inlet connected to a main air line and an outlet selectively connected to said axial air passageways in the shaft, (j) an hydraulic motor mounted within the forward end of the boom assembly coupled to drive the head shaft and having an operating conduit means carried by the boom assembly, said hydraulic motor being of a constant torque and variable speed construction to rapidly accelerate the head to a selected operating speed, (k) a rotary union mounted on the forward end of the boom assembly, a rotating spindle secured to the head shaft and rotatably journaled within a fixed body with aligned central axial paint passageways in the spindle and body end of the spindle being radially spaced from the body to define an annular chamber housing, a multiple element seal axially compressible for establishing a liquid seal therebetween, and being slightly spaced axially from an inner wall of the body to introduce high pressure paint into the annular chamber.

3. A spraying apparatus for coating the interior surfaces of tubular members with an epoxy resin paint mixture comprising, (a) a coating booth having aligned wall openings through which the tubular member passes, (b) a series of spaced conveyor rollers mounted in alignment with the openings on opposite sides of the booth and having at least one roller disposed within the booth, (c) a reversible hydraulic motor of a constant torque and variable speed, coupled to simultaneously rotate the roller within the booth and the first roller to either side thereof, (d) means coupling the last named rollers to the adjacent rollers, (e) means to record the linear speed of the tubular member, (f) a boom assembly mounted overlying the rollers to one side of the booth and being pivotally supported at the outer end, (g) a vertically movable support disposed adjacent the forward portion of the boom assembly and movable to a raised position to align the boom assembly with an incoming member, (h) a stabilizing unit secured as a forward part of the bom assembly and having vertically adjustable guide wheels and horizontally adjustable guide wheels for engaging the interior surfaces of the member and supporting the boom assembly on the member, (i) a shaft housing mounted as a forward portion of the boom assembly, (j) a rotating shaft rotatably mounted within the housing and extending forwardly thereof and terminating in a reduced threaded portion, said shaft having a central axial paint passageway and a series of circumferentially distributed outer axial air passageways, (k) a rotating head threaded onto the threaded end of the rotating shaft and having a central paint passageway abutting the paint passageway of the shaft and having an outer portion telescoped over the shaft adjacent the threaded portion to define an annular air chamber connecting the air passageways in the head with the air passageways in the shaft, (l) releasable lock means secured to the shaft and to the head to prevent unthreading of the head from the shaft, (m) a plurality of airless spray guns fixed on the head in operative connection to said paint passageway and having individual air actuated trigger means connected to an air passageway in the head, (n) an air control valve mounted upon said housing with an inlet connected to a main air line and an outlet selectively connected to said axial air passageways in the shaft and having a control air line, for connecting the inlet and the outlet, (o) a control and drive unit interposed in the boom assembly immediately behind the shaft housing, (p) an hydraulic motor mounted within the drive unit and having an output shaft coupled to the end of the shaft and having an operating line carried by the boom assembly, said hydraulic motor being of a constant high torque and variable speed construction to rapidly accelerate the head to a selected operating speed, (q) means to record the rotational speed of the last named motor output, (r) a solenoid-operated valve coupling said control air line to the main air line and having operating leads carried by the boom assembly, (s) a rotary union within the drive unit having a stationary body secured to the incoming paint line and carried by the boom assembly and a rotating spindle rotatably journaled therein with a central axial paint passageway, the inner end of the spindle being spaced from the body to introduce high pressure paint in the space therebetween a multiple element seal of the rotary union being disposed in an annular recess between the body and spindle and communicating with said space to compress the seal and maintain a high pressure liquid seal therebetween, (t) a leak detecting opening in the union communicating with said recess to indicate the leakage of paint past said seal, (u) a rotatable drum mounted within the booth encircling said spray guns, and (v) means to continuously rotate the drum during a coating operation.

4. The construction of the spraying apparatus of claim 3 for applying the paint to a tubular member having a longitudinal protrusion, having (a) an airless spray gun secured to the boom assembly within the rotating drum and arranged to apply an additional coating of paint to the protrusion, and (b) individual means for supplying paint to the spray gun and to control operation of the gun.

5. In a rotary quick change head for releasably securing an applicator to a stationary mounting member, (a) a rotating shaft rotatably secured to the member and having an axial material passageway and a longitudinal air transmitting passageway, said shaft having a reduced diameter outer end extension, (b) a head body threaded onto the outer end extension and telescoped over the shaft adjacent the extension to define an annular air chamber between the shaft and the body and having an air passageway connected to the annular chamber, (c) sealing means disposed between the shaft and the body on opposite sides of the chamber, and (d) an applicator secured to the head and having a material passageway communicating with the material passageway of the head and having an air actuated trigger within an air passageway thereto communicating with the air passageway in the head.

6. Apparatus for coating the internal surface of a tubular member having a longitudinal internal protrusion,
(a) a cantilever boom,
(b) means to telescope the member onto the boom,
(c) a rotating spray applicator secured to the end of the boom,
(d) a fixed spray applicator connected to the conduit means and mounted on the boom and arranged to apply an extra coating to the area of the protrusion, and
(e) conduit means carried by the boom for delivering coating material to the applicators.

7. The construction of claim 6 having
(a) individual electroresponsive control means for operating said rotating spray applicator and fixed spray applicator, and
(b) signal lines connected to the control means and supported by the boom.

8. In apparatus for coating the interior of tubular articles,
(a) a cantilevered boom arm including a mounting means supporting said arm against axial movement,
(b) an airless spray liquid applicator rotatably secured to the free end of the boom arm,
(c) a non-rotatable liquid coating material line extending substantially coextensively of the boom arm,
(d) a rotating hi-pressure coupling mounted on the forward end of the boom arm and connecting the line to the applicator,
(e) a constant torque hydraulic motor mounted on the free end of the boom arm adjacent the applicator and coupled to rotate the applicator,
(f) said applicator includes a high-pressure spray gun having an air actuated valve control for controlling the emitting of the coating material,
(g) an air control valve mounted on the free end of the boom arm adjacent the applicator,
(h) means connecting the air control valve to the gun,
(i) an air line extending rearwardly with the boom arm and selectively coupled to the air control valve to actuate the spray gun, and
(j) means to control said air control valve.
(k) constant speed transfer means for telescopically moving the tubular member with respect to the boom, and
(l) means to indicate the linear speed of the tube member.

9. In apparatus for coating the interior of tubular articles,
(a) a cantilevered boom arm,
(b) an airless spray liquid applicator including a shaft rotatably secured to the outer free end of the boom arm,
(c) a non-rotatable liquid coating material line extending substantially coextensively of the boom arm,
(d) a rotating hi-pressure coupling mounted on the forward end of the boom arm and connecting the line to the applicator, said hi-pressure rotating coupling including a rotating spindle secured to said shaft and telescoped into the open end of a stationary cup-shaped body rotatably supporting said spindle, said spindle having an axial passageway and said body having an L-shaped passageway extending axially from the passageway in the spindle and then radially outwardly,
(e) the inner end of the spindle being spaced from the body and being of lesser diameter for a portion of its length adjacent the end to define an annular chamber therebetween,
(f) annular sealing members disposed within said chamber and subjected to the pressure of the incoming coating material to establish a rotating seal between the spindle and the body, and
(g) a constant torque hydraulic motor mounted on the free end of the boom arm adjacent the applicator and coupled to rotate the applicator.

References Cited

UNITED STATES PATENTS

| | | | |
|---|---|---|---|
| Re. 24,601 | 2/1959 | Lewis | 117—96 |
| 1,913,757 | 6/1933 | Hannon | 117—96 |
| 2,168,917 | 8/1939 | Perkins | 118—315 X |
| 2,845,366 | 7/1958 | Schroeder | 117—96 |
| 2,895,449 | 7/1959 | Oldfield | 118—306 |
| 2,954,585 | 10/1960 | Simpson | 18—20 |
| 3,037,228 | 6/1962 | Cummings | 118—306 X |
| 3,071,107 | 1/1963 | Stanley | 118—306 |
| 3,078,823 | 2/1963 | Cummings et al. | 118—306 |

FOREIGN PATENTS 1,142,659  4/1957  France.

MORRIS KAPLAN, *Primary Examiner.*

RICHARD D. NEVIUS, *Examiner.*